US012415505B2

(12) United States Patent
Suzuki et al.

(10) Patent No.: US 12,415,505 B2
(45) Date of Patent: Sep. 16, 2025

(54) PARKING ASSISTING METHOD AND PARKING ASSISTANCE DEVICE

(71) Applicant: Nissan Motor Co., Ltd., Yokohama (JP)

(72) Inventors: Yasuhiro Suzuki, Kanagawa (JP); Yusuke Musha, Kanagawa (JP); Manato Matsumoto, Kanagawa (JP); Ryota Yamanaka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/876,595

(22) PCT Filed: Jun. 24, 2022

(86) PCT No.: PCT/JP2022/025333
§ 371 (c)(1),
(2) Date: Dec. 18, 2024

(87) PCT Pub. No.: WO2023/248468
PCT Pub. Date: Dec. 28, 2023

(65) Prior Publication Data
US 2025/0269841 A1    Aug. 28, 2025

(51) Int. Cl.
*G08G 1/14* (2006.01)
*B60W 30/06* (2006.01)
*G06V 20/58* (2022.01)

(52) U.S. Cl.
CPC .......... *B60W 30/06* (2013.01); *G06V 20/586* (2022.01); *G08G 1/145* (2013.01);
(Continued)

(58) Field of Classification Search
CPC .......... B60W 30/06; B60W 2420/403; B60W 2540/215; B60W 2552/53;
(Continued)

(56) References Cited
U.S. PATENT DOCUMENTS 8,232,893 B2   7/2012   Endo et al.
8,374,749 B2   2/2013   Tanaka
(Continued)

FOREIGN PATENT DOCUMENTS

CN   101641241 A     2/2010
JP   2017-138664 A   8/2017
(Continued)

*Primary Examiner* — Anh V La
(74) *Attorney, Agent, or Firm* — Young Basile Hanlon & MacFarlane, P.C.

(57) ABSTRACT

Whether an own vehicle is positioned in a parking space of a first type including a plurality of parking sections or the own vehicle is positioned in a vicinity of a parking space of a second type in which a single vehicle can be parked is determined. In a case where the own vehicle is determined to be positioned in the parking space of the first type, data representing a relative positional relationship between a target object indicating a parking section and a parking position in the target parking section are stored in a storage device, and in a case where the own vehicle is determined to be positioned in a vicinity of the parking space of the second type, data representing a relative positional relationship between a target object detected in the vicinity of the parking space and a target parking position are stored in the storage device.

8 Claims, 6 Drawing Sheets

(52) U.S. Cl.
CPC . *B60W 2420/403* (2013.01); *B60W 2540/215* (2020.02); *B60W 2552/53* (2020.02); *B60W 2556/40* (2020.02); *B60W 2556/50* (2020.02); *G06V 2201/07* (2022.01)

(58) Field of Classification Search
CPC .......... B60W 2556/40; B60W 2556/50; G06V 20/586; G06V 2201/07; G08G 1/145
USPC .................. 340/932.2, 933, 937, 988, 995.1
See application file for complete search history.

(56) References Cited

U.S. PATENT DOCUMENTS

| | | |
|---|---|---|
| 10,650,681 B2 | 5/2020 | Tanigawa et al. |
| 10,953,869 B2 | 3/2021 | Iio et al. |
| 2009/0174574 A1 | 7/2009 | Endo et al. |
| 2010/0049402 A1 | 2/2010 | Tanaka |
| 2018/0068564 A1 | 3/2018 | Tanigawa et al. |
| 2018/0265079 A1* | 9/2018 | Nakada ................ G05D 1/0223 |
| 2019/0039605 A1 | 2/2019 | Iio et al. |
| 2020/0398826 A1* | 12/2020 | Tsujino ................ B60W 50/14 |
| 2021/0213937 A1* | 7/2021 | Imai ................... B62D 15/0285 |
| 2021/0323538 A1* | 10/2021 | Takahashi ............... G08G 1/143 |

FOREIGN PATENT DOCUMENTS

| | | |
|---|---|---|
| JP | 2018-041176 A | 3/2018 |
| JP | 2020-062962 A | 4/2020 |
| WO | 2007/122862 A1 | 11/2007 |

\* cited by examiner

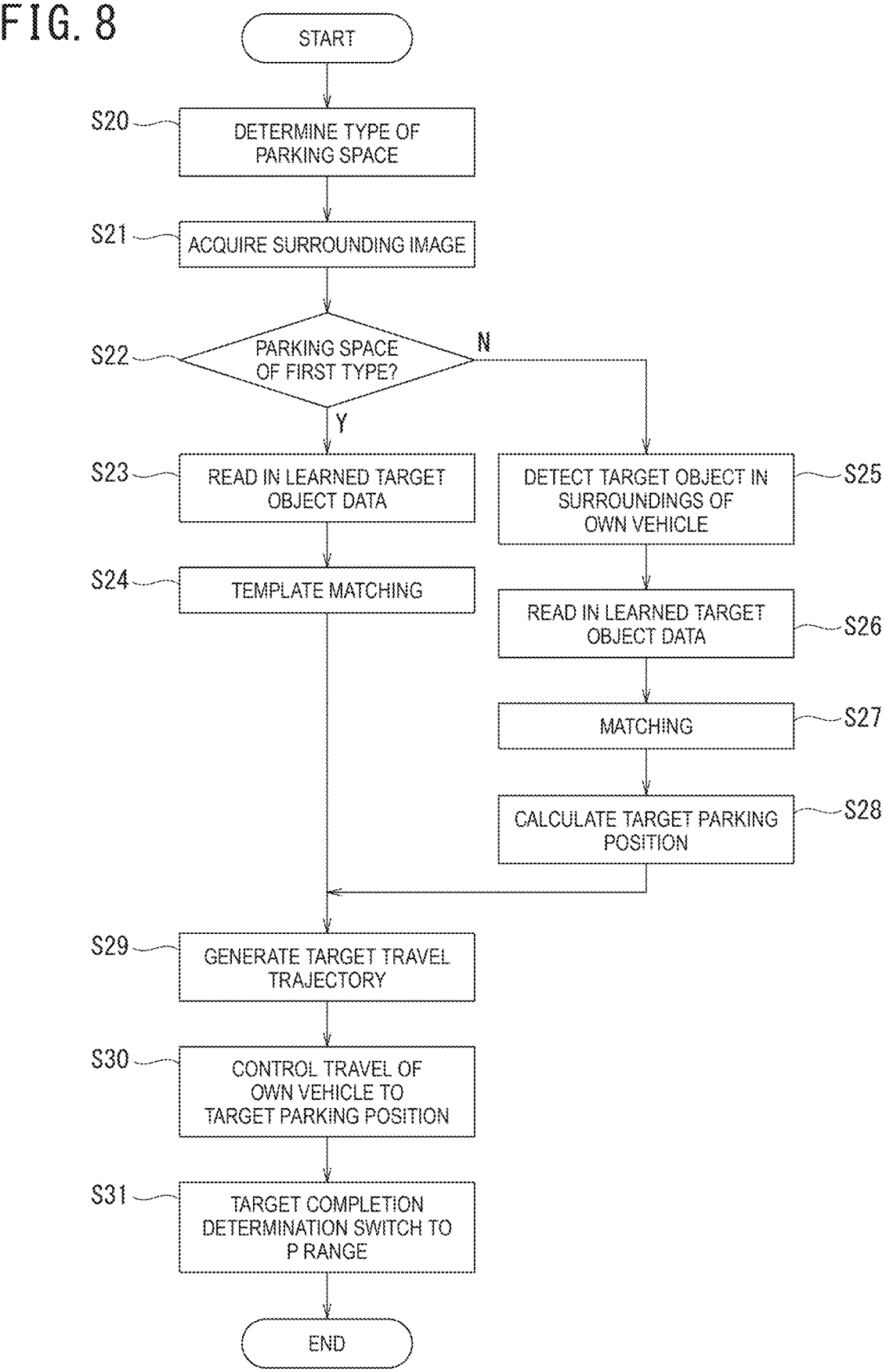

PARKING ASSISTING METHOD AND PARKING ASSISTANCE DEVICE

TECHNICAL FIELD

The present invention relates to a parking assisting method and a parking assistance device.

BACKGROUND

In JP 2017-138664 A, a driving control device configured to extract a target object from an image in which surroundings of a target parking position was captured in the past and store the target object, calculate a relative position of the target parking position with respect to the own vehicle, based on a position of the stored target object and a position of a target object extracted from an image in which surroundings of the own vehicle is captured at the time of autonomous parking, and cause the own vehicle to autonomously move to the target parking position, based on the calculated relative position is described.

SUMMARY

However, when a plurality of parking sections (parking spaces) exist like a case of a parking lot attached to a facility, such as a company, a hospital, a store, an apartment house, and a public facility, there is a problem in that when one of the parking sections is stored as a target parking position, the own vehicle is always parked only at the same parking space.

An object of the present invention is to be, in parking assistance to store a target object in a vicinity of a target parking position in advance and assist parking of the own vehicle at the target parking position, able to park an own vehicle in an arbitrary parking section when a plurality of parking sections exist in a parking space.

According to an aspect of the present invention, there is provided a parking assisting method for assisting parking of an own vehicle at a target parking position, the parking assisting method including: storing data representing a relative positional relationship between a target object existing in surroundings of a target parking position and the target parking position, in a storage device as learned target object data, in advance; detecting a position of a surrounding target object, the surrounding target object being a target object existing in surroundings of the own vehicle; calculating a relative positional relationship between the target parking position and a current position of the own vehicle, based on the learned target object data and a position of the surrounding target object; calculating a travel trajectory starting from a current position of the own vehicle and reaching the target parking position, based on a relative positional relationship between the target parking position and a current position of the own vehicle; and assisting parking of the own vehicle at the target parking position, based on the travel trajectory, wherein the parking assisting method further determines whether the own vehicle is positioned in a parking space of a first type including a plurality of parking sections or the own vehicle is positioned in a vicinity of a parking space of a second type in which a single vehicle can be parked, and in a case of determining that the own vehicle is positioned in the parking space of the first type, when the own vehicle is parked in a target parking section, the target parking section being one parking section of the plurality of parking sections, stores data representing a relative positional relationship between a target object common to the plurality of parking sections, which indicates a parking section and a parking position in the target parking section, in the storage device as the learned target object data, and in a case of determining that the own vehicle is positioned in a vicinity of the parking space of the second type, stores data representing a relative positional relationship between a target object detected in a vicinity of the parking space of the second type when the own vehicle is parked in the parking space of the second type and the target parking position, in the storage device as the learned target object data.

According to an aspect of the present invention, it is possible to be, in parking assistance to store a target object in a vicinity of a target parking position in advance and assist parking of the own vehicle at the target parking position, able to park an own vehicle in an arbitrary parking section when a plurality of parking sections exist in a parking space.

BRIEF DESCRIPTION OF THE DRAWINGS

FIG. 8 is a flowchart of the second example of the processing performed when the parking assistance is performed.

DETAILED DESCRIPTION

[(Configuration)

Figure 1:
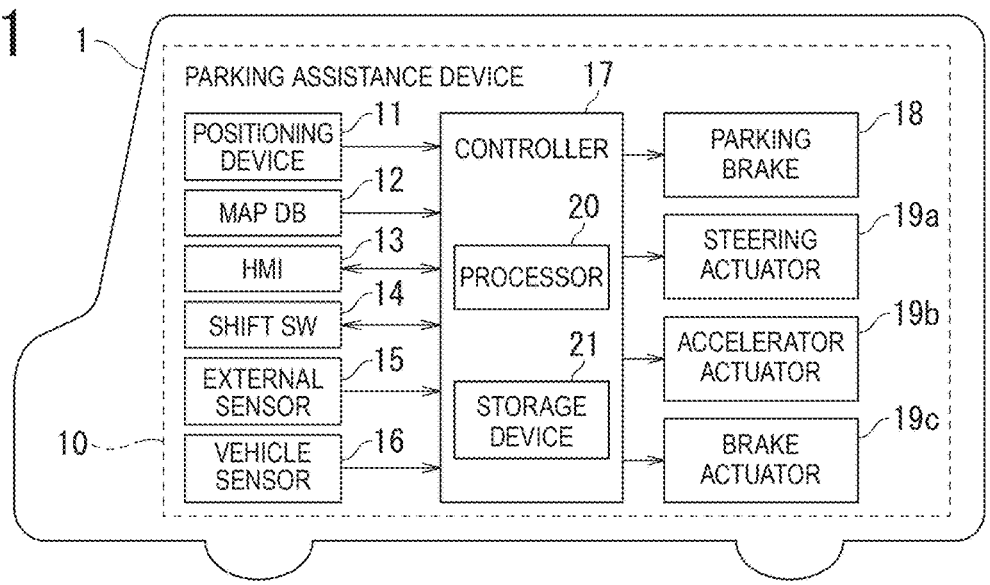
FIG. 1 is a diagram illustrative of a schematic configuration example of a parking assistance device.

FIG. 1 is now referred to. An own vehicle 1 includes a parking assistance device 10 configured to assist parking of the own vehicle 1 at a target parking position. The parking assistance device 10 assists the own vehicle 1 in traveling along a target travel trajectory from a current position of the own vehicle 1 to the target parking position. For example, the parking assistance device 10 may perform autonomous driving in which the own vehicle 1 is controlled to autonomously travel to the target parking position along the target travel trajectory of the own vehicle 1. The autonomous driving in which the own vehicle 1 is controlled to autonomously travel to the target parking position along the target travel trajectory of the own vehicle 1 means control to cause the own vehicle 1 to control all or some of a steering angle, driving force, and braking force thereof and autonomously perform all or a portion of travel along the target travel trajectory of the vehicle 1. Alternatively, the parking assistance device 10 may assist parking of the own vehicle 1 by displaying the target travel trajectory and the current position of the own vehicle 1 on a display device that a passenger of the own vehicle 1 can visually recognize.

A positioning device 11 measures the current position of the own vehicle 1. The positioning device 11 includes, for example, a global navigation satellite system (GNSS) receiver.

In a map database (map DB) 12, map data are stored. The map data stored in the map database 12 may be, for example, map data for navigation or high-definition map data that is suitable as a map for autonomous driving. The map data includes information about a location and an area of a parking space attached to a facility, such as a company, a hospital, a store, an apartment house, and a public facility.

Human-machine interfaces (HMIs) 13 are interface devices that transfer information between the parking assistance device 10 and the passenger. The HMIs 13 include the display device that the passenger of the own vehicle 1 can visually recognize, a speaker, a buzzer, and an operation element.

A shift switch (shift SW) 14 is a switch for a driver or the parking assistance device 10 to switch a shift position of the own vehicle 1.

External sensors 15 detect an object existing in a predetermined distance range from the own vehicle 1. The external sensors 15 detect a surrounding environment of the own vehicle 1, such as a relative position between an object existing in surroundings of the own vehicle 1 and the own vehicle 1, distance between the own vehicle 1 and the object, and a direction in which the object exists. The external sensors 15 may include, for example, a camera to capture an image depicting the surrounding environment of the own vehicle 1. In the following description, the camera included in the external sensors 15 is simply referred to as "camera". The external sensors 15 may include a ranging device, such as a laser range finder, a radar, or a light detection and ranging (LiDAR).

Vehicle sensors 16 detect various information (vehicle information) about the own vehicle 1. The vehicle sensors 16 include, for example, a vehicle speed sensor configured to detect travel speed of the own vehicle 1, wheel speed sensors configured to detect rotational speeds of respective tires that the own vehicle 1 includes, a triaxial acceleration sensor (G sensor) configured to detect acceleration (including deceleration) in three axial directions of the own vehicle 1, a steering angle sensor configured to detect a steering angle, a turning angle sensor configured to detect a turning angle of steered wheels, a gyro sensor, and a yaw rate sensor.

A controller 17 is an electronic control unit that performs parking assistance control of the own vehicle 1. The controller 17 includes a processor 20 and peripheral components, such as a storage device 21. The processor 20 may be, for example, a CPU or an MPU. The storage device 21 may include a semiconductor storage device, a magnetic storage device, an optical storage device, or the like. Functions of the controller 17, which will be described below, may be achieved by, for example, the processor 20 executing computer programs stored in the storage device 21. Note that the controller 17 may be formed using dedicated hardware for performing various types of information processing that will be described below.

A steering actuator 19*a* controls steering direction and the amount of steering of a steering mechanism of the own vehicle 1 in accordance with a control signal from the controller 17. An accelerator actuator 19*b* controls accelerator opening of a drive device, which is an engine or a drive motor, in accordance with a control signal from the controller 17. A brake actuator 19*c* causes a braking device to operate in accordance with a control signal from the controller 17.

Next, the parking assistance control performed by the parking assistance device 10 will be described. When parking assistance performed by the parking assistance device 10 is used, the parking assistance device 10 stores data representing a relative positional relationship between a target object existing in surroundings of a target parking position that is a position at which the own vehicle 1 is to be parked and the target parking position, in the storage device 21 in advance. In the following description, data representing a relative positional relationship between a target object and the target parking position to be stored in the storage device 21 are sometimes referred to as "learned target object data".

For example, when the own vehicle 1 is positioned in a vicinity of the target parking position, the parking assistance device 10 may detect a target object existing in the surroundings of the target parking position using the external sensors 15. For example, when the passenger (for example, the driver) of the own vehicle 1 is to park the own vehicle 1 at the target parking position by manual driving, the parking assistance device 10 may detect a target object existing in the surroundings of the own vehicle 1, using the external sensors 15. For example, when the own vehicle 1 is parked at the target parking position, the parking assistance device 10 may detect a target object existing in the surroundings of the own vehicle 1, using the external sensors 15. On this occasion, the parking assistance device 10 may, for example, detect a target object from an image depicting the surroundings of the own vehicle 1 captured by the camera or may detect a target object in the surroundings of the own vehicle 1, using the ranging device.

The learned target object data to be stored in the storage device 21 may include data representing a feature of a detected target object (in the following description, sometimes referred to as "target object feature data") and data representing a relative positional relationship between the target object and the target parking position (in the following description, sometimes referred to as "relative position data").

Figure 2A:
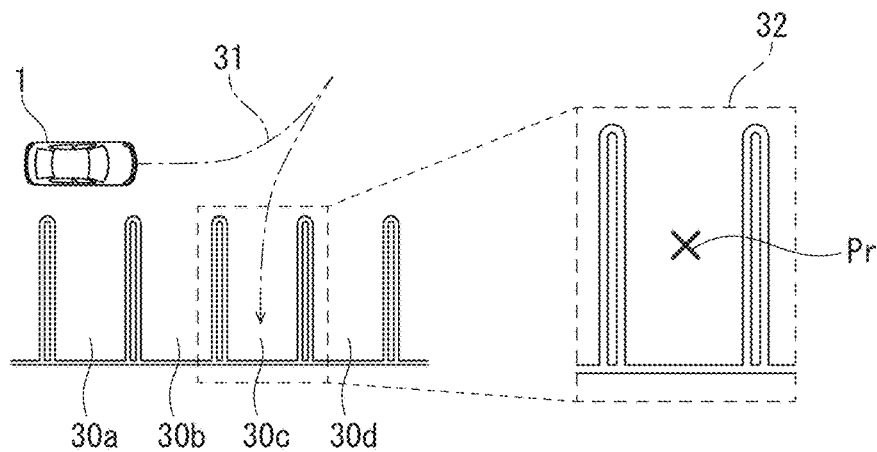
FIG. 2A is an explanatory diagram of a first example of processing of storing learned target object data.
Figure 3A:
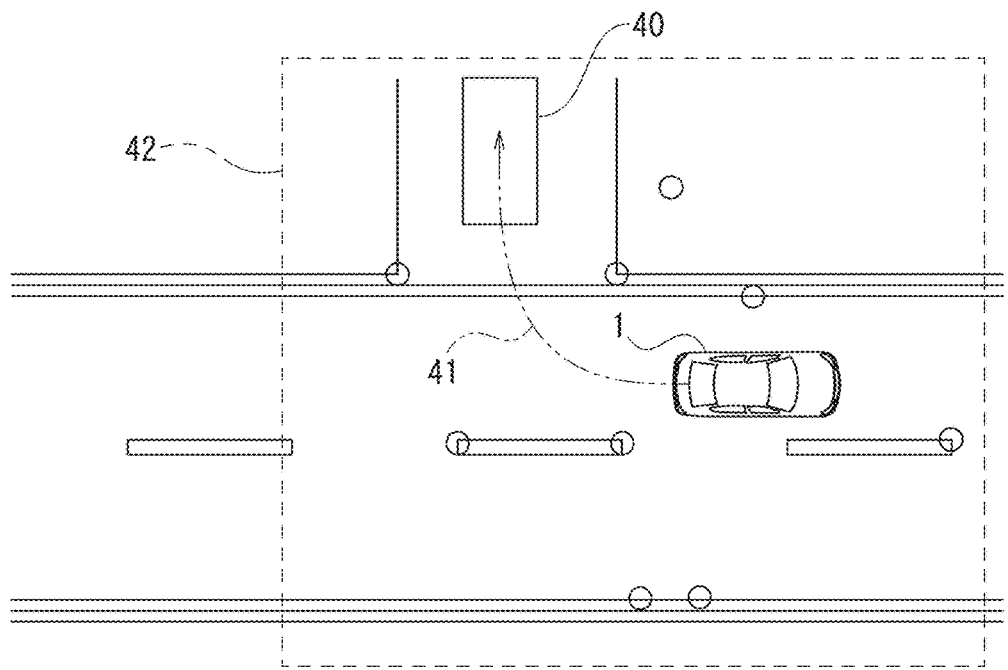
FIG. 3A is an explanatory diagram of a second example of the processing of storing learned target object data.

FIGS. 2A and 3A are explanatory diagrams of examples of processing of storing learned target object data. When learned target object data are to be stored in the storage device 21, the passenger, for example, operates a "parking position learning switch" that is prepared as an operation element in the HMIs 13.

When the controller 17 stores learned target object data, the controller 17 determines whether the own vehicle 1 is positioned in a parking space including a plurality of parking sections (in the following description, sometimes referred to as "parking space of a first type") or the own vehicle 1 is positioned in a vicinity of a parking space in which a single vehicle can be parked (in the following description, sometimes referred to as "parking space of a second type").

Examples of the parking space of the first type include a parking lot attached to a facility, such as a company, a hospital, a store, an apartment house, and a public facility. Examples of the parking space of the second type include a parking space attached to a private house.

A parking space illustrated in FIG. 2A is a parking space of the first type that includes a plurality of parking sections 30*a* to 30*d*. For example, a case where the own vehicle 1 moves along a path 31 by manual driving and is parked in the parking section 30*c* is assumed. The parking section 30*c* is an example of a "target parking section" described in the claims.

The controller 17 detects, as a target object indicating that the parking section 30c is a parking section, a pavement marking indicating the parking section 30c (for example, white lines indicating a frame of a parking section) that is marked on a road surface of the parking space or a distinctive target object that is a three-dimensional object, such as a wheel stopper, from an image depicting the surroundings of the own vehicle 1 captured by the camera. The controller 17 stores target object feature data representing a feature of a detected pavement marking and relative position data between the detected pavement marking and the target parking position in the parking section, in the storage device 21 as learned target object data.

For example, the controller 17 may store a pattern 32 of a detected pavement marking in the storage device 21 as target object feature data. In addition, the controller 17 may store relative position data between a parking position Pr when the own vehicle 1 is parked in the parking section 30c and the pattern 32 in the storage device 21. For example, the controller 17 may store coordinates in a vehicle coordinate system (that is, a coordinate system with reference to the current position of the own vehicle 1) of a pavement marking detected when the own vehicle 1 is parked in the parking section 30c, as the relative position data.

In the following description, the pattern 32 of the pavement marking indicating a parking section is sometimes referred to as "pavement pattern". For example, the controller 17 may extract, from an image obtained by capturing the surroundings of the own vehicle 1 by the camera, a partial image depicting a local region including all or a portion of a pavement marking indicating a single parking section and store the extracted partial image in the storage device 21 as a pavement pattern 32.

As described above, in the case of the parking space of the first type including the plurality of parking sections 30a to 30d, the controller 17 stores local information representing a feature of a pavement marking of a unit parking section within a pavement marking of the entire parking space, in the storage device 21 as the target object feature data. For example, the controller 17 stores a local pavement pattern 32 representing a pavement marking of a unit parking section, in the storage device 21. On this occasion, the controller 17 may determine whether or not the pavement pattern 32 has a feature common to the plurality of parking sections 30a to 30d, which indicates that a section represented by the pavement pattern 32 is a parking section and, when the pavement pattern 32 has a feature common to the plurality of parking sections 30a to 30d, which indicates a parking section, the controller 17 may store the pavement pattern 32. For example, the controller 17 may determine whether or not the pavement pattern 32 has a feature common to the plurality of parking sections 30a to 30d, which indicates that a section represented by the pavement pattern 32 is a parking section by determining whether or not a plurality of pavement patterns 32 successively appear in the image obtained by capturing the surroundings of the own vehicle 1 by the camera.

A parking space illustrated in FIG. 3A is a parking space of the second type and includes a parking space 40 in which a single vehicle can be parked. For example, a case where when the own vehicle 1 moves along a path 41 by manual driving and is parked in the parking space 40, the parking space 40 is stored in the storage device 21 as a target parking position is assumed.

The controller 17 detects a target object in surroundings of the parking space 40 from an image obtained by capturing the surroundings of the own vehicle 1 by the camera when the own vehicle 1 is positioned in a vicinity of the parking space 40 (for example, when the passenger parks the own vehicle 1 in the parking space 40 by manual driving). For example, the controller 17 may detect a feature point in the image as a target object in the surroundings of the parking space 40. For example, the controller 17 may detect, as a feature point, an edge point at which luminance changes between adjacent pixels by a predetermined amount or more or a point having a characteristic shape, such as an edge and a corner of a target object like a pavement marking, a road boundary, an obstacle, or the like, in a captured image captured by the camera.

The controller 17 stores target object feature data representing a feature of a target object detected in a predetermined region 42 in the surroundings of the parking space 40, in the storage device 21 as learned target object data. For example, the controller 17 may store a feature point and feature amount of a detected target object in the storage device 21 as the target object feature data. In addition, the controller 17 stores relative position data between the parking space 40, which is the parking target position, and a target object, in the storage device 21 as the learned target object data.

In FIG. 3A, circular marks schematically indicates target objects stored as the learned target object data.

When the controller 17 stores relative position data between a target object and the parking space 40, the controller 17 may store coordinates of the target object and the parking space 40 in a coordinate system with a fixed point as a reference point (hereinafter, referred to as "map coordinate system"). In this case, the controller 17 may store a current position in the map coordinate system that is measured when the own vehicle 1 is positioned in the parking space 40, as a position of the parking space 40. Alternatively, the controller 17 may store a relative position of the parking space 40 with respect to each target object in place of positions in the map coordinate system.

Note that the predetermined region 42 for which the learned target object data are stored may be, for example, a region one side or the diameter of which is approximately 20 to 30 m. As described above, when learned target object data in the surroundings of the parking space 40 as a parking space of the second type are stored, an overall arrangement pattern of target objects (feature points) in a comparatively wide area including the parking space 40 is stored in the storage device 21.

On the other hand, when learned target object data relating to the parking section 30c in a parking space of the first type are stored, a local pattern representing a target object (pavement marking) in a comparatively narrow area equivalent to one parking section is stored in the storage device 21. That is, a first range for which a target object is stored in a parking space of the first type is smaller than a second range for which a target object is stored in a parking space of the second type.

Figure 2B:
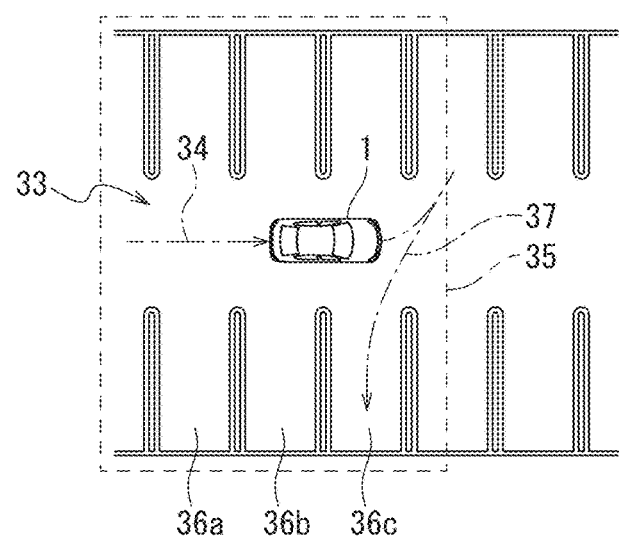
FIG. 2B is an explanatory diagram of a first example of processing performed when parking assistance is performed.

FIG. 2B is an explanatory diagram of an example of processing performed when the parking assistance is performed in a parking space of the first type. The controller 17 performs the parking assistance of the own vehicle 1 when the own vehicle 1 is positioned in the parking space of the first type and a predetermined parking assistance start condition is established. For example, the controller 17 may determine whether or not the own vehicle 1 is positioned in the parking space of the first type, based on the current position of the own vehicle 1 measured by the positioning device 11 and information about the parking space stored in the map DB 12.

The controller 17 determines, as the parking assistance start condition, whether or not the passenger performs a shift operation for turnabout to switch forward movement and backward movement of the own vehicle 1 when the own vehicle 1 is positioned in the parking space of the first type. The controller 17 may determine that a shift operation for turnabout is performed when the shift position is changed from a drive range (D range) to a reverse range (R range) or changed from the R range to the D range, and start the parking assistance.

The controller 17 may determine, as the parking assistance start condition, whether or not the passenger operates a "parking assistance activation switch" that is prepared as an HMI 13 and, when the parking assistance activation switch is operated, start the parking assistance.

The controller 17 generates an image depicting a surrounding region 35 of the own vehicle 1 (a surrounding image) by accumulating images obtained by capturing the surroundings of the own vehicle 1 by the camera while the own vehicle 1 travels along a trajectory 34 in a drive aisle 33 in the parking space of the first type.

The controller 17 detects one or more parking sections 36a to 36c existing in the surroundings of the own vehicle 1 by detecting a region including a target object that has a feature similar to the target object feature data stored as the learned target object data (that is, the target object feature data of the target object indicating a parking section) from the surrounding image. For example, the controller 17 detects the parking sections 36a to 36c by detecting a region including a pavement marking similar to the pavement pattern 32 common to the plurality of parking sections 36a to 36c, which indicates a parking section, from the surrounding image. The parking sections 36a to 36c are examples of a "surrounding target object" described in the claims.

For example, the controller 17 may detect the parking sections 36a to 36c by applying template matching to the surrounding image, using the pavement pattern 32 as a template. For example, the controller 17 may cause the surrounding image to be scanned by the pavement pattern 32, calculate a degree of similarity between the pavement pattern 32 and the surrounding image at each position in the surrounding image, and detect a region in which the degree of similarity is greater than or equal to a threshold value.

Figure 2C:
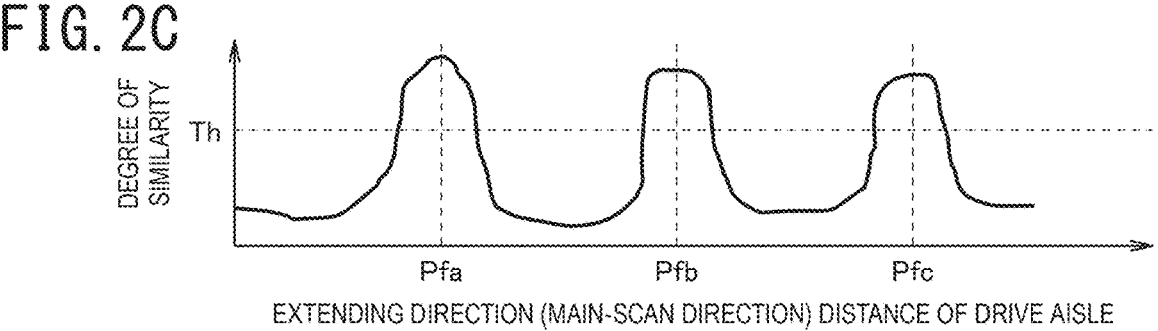
FIG. 2C is an explanatory diagram of an example of a detection method of a parking section.

FIG. 2C is an explanatory diagram of an example of a detection method of a parking section. For example, the controller 17 sets an extending direction of the drive aisle 33 as a main-scan direction and, while changing a position in a sub-scan direction every time one main scan is completed, causes the surrounding image depicting the surrounding region 35 of the own vehicle 1 to be scanned by the pavement pattern 32. The controller 17 calculates a degree of similarity between the pavement pattern 32 and the surrounding image at each position in the surrounding image and detects positions Pfa, Pfb, and Pfc at which the degree of similarity is greater than or equal to a threshold value Th as the positions of the parking sections 36a to 36c, respectively.

FIG. 2B is now referred to. The controller 17 selects a parking section in which the own vehicle 1 is to be parked from the detected parking sections 36a to 36c. For example, the controller 17 may present parking section candidates to the passenger by displaying the detected parking sections 36a to 36c on an HMI 13 and select a parking section in which the own vehicle 1 is to be parked by accepting a selection input from the passenger to select one of the parking section candidates. In addition, the controller 17 may select a parking section in which the own vehicle 1 can be parked with a shortest travel path. Herein, a case where the parking section 36c is selected is assumed.

When the parking section 36c is selected as a parking section in which the own vehicle 1 is to be parked, the controller 17 calculates a relative position of the own vehicle 1 with respect to a target parking position, based on a detected position of the parking section 36c and relative position data between the target object and the target parking position (that is, relative position data between the pavement marking indicating the parking section and the target parking position), the relative position data being stored as the learned target object data.

For example, the controller 17 calculates a relative position of the own vehicle 1 with respect to the target parking position, based on the detected position of the parking section 36c and the relative position data between a parking position Pr when the own vehicle 1 is parked in the parking section 30c and the pavement marking of the parking section 30c, the relative position data being stored as the learned target object data.

The controller 17 calculates a target travel trajectory 37 starting from the current position of the own vehicle 1 and reaching the target parking position, based on the relative position of the own vehicle 1 with respect to the target parking position. The controller 17 performs the parking assistance control of the own vehicle 1, based on the calculated target travel trajectory.

Figure 3B:
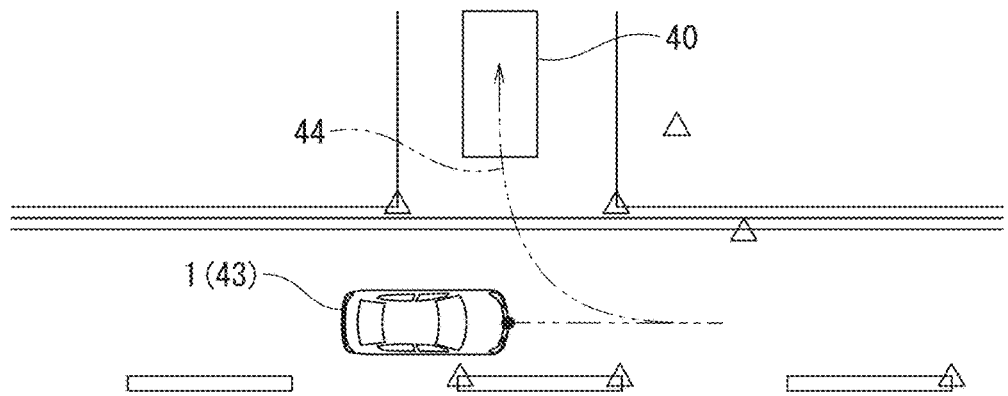
FIG. 3B is an explanatory diagram of a second example of the processing performed when the parking assistance is performed.

FIG. 3B is an explanatory diagram of an example of processing performed when the parking assistance is performed in a parking space of the second type. The controller 17 performs the parking assistance of the own vehicle 1 when the own vehicle 1 is positioned in a vicinity of a parking space (that is, a target parking position) 40 and the above-described parking assistance start condition is established.

The controller 17 detects a target object in the surroundings of the own vehicle 1 from a surrounding image that is obtained by capturing the surroundings of the own vehicle 1 by the camera. In the following description, a target object in the surroundings of the own vehicle 1 that is extracted when the parking assistance is performed is another example of the "surrounding target object" described in the claims. In FIG. 3B, triangular marks represents surrounding target objects.

The controller 17 matches the learned target object data stored in the storage device 21 and the surrounding target object with each other and associates the same target objects with each other.

The controller 17 calculates a relative position of the own vehicle 1 with respect to a target parking position 40 (that is, a relative position of the own vehicle 1 with respect to the target parking position), based on a relative positional relationship between a surrounding target object detected when the parking assistance is performed and the own vehicle 1 and a relative positional relationship between a target object represented by the learned target object data associated with the surrounding target object and the target parking position 40.

For example, the controller 17 may calculate a position of the target parking position 40 in the vehicle coordinate system. For example, when coordinates of the target object and coordinates of the target parking position 40 in the learned target object data are represented as coordinates in the map coordinate system, the controller 17 may convert the coordinates of the target parking position 40 in the map coordinate system to coordinates of the target parking position 40 in the vehicle coordinate system, based on coordinates in the vehicle coordinate system of the surrounding target object detected when the parking assistance is performed and the coordinates in the map coordinate system of the target object represented by the learned target object data.

Alternatively, the controller 17 may calculate the current position of the own vehicle 1 in the map coordinate system, based on the coordinates in the vehicle coordinate system of the surrounding target object detected when the parking assistance is performed and the coordinates in the map coordinate system of the target object represented by the learned target object data, and calculate the relative position of the own vehicle 1 with respect to the target parking position 40 from a difference between the coordinates of the own vehicle 1 and the coordinates of the target parking position 40 in the map coordinate system.

The controller 17 calculates a target travel trajectory 44 starting from a current position 43 of the own vehicle 1 and reaching the target parking position 40, based on the relative position of the own vehicle 1 with respect to the target parking position 40. The controller 17 performs the parking assistance control of the own vehicle 1, based on the calculated target travel trajectory 44.

Figure 4:
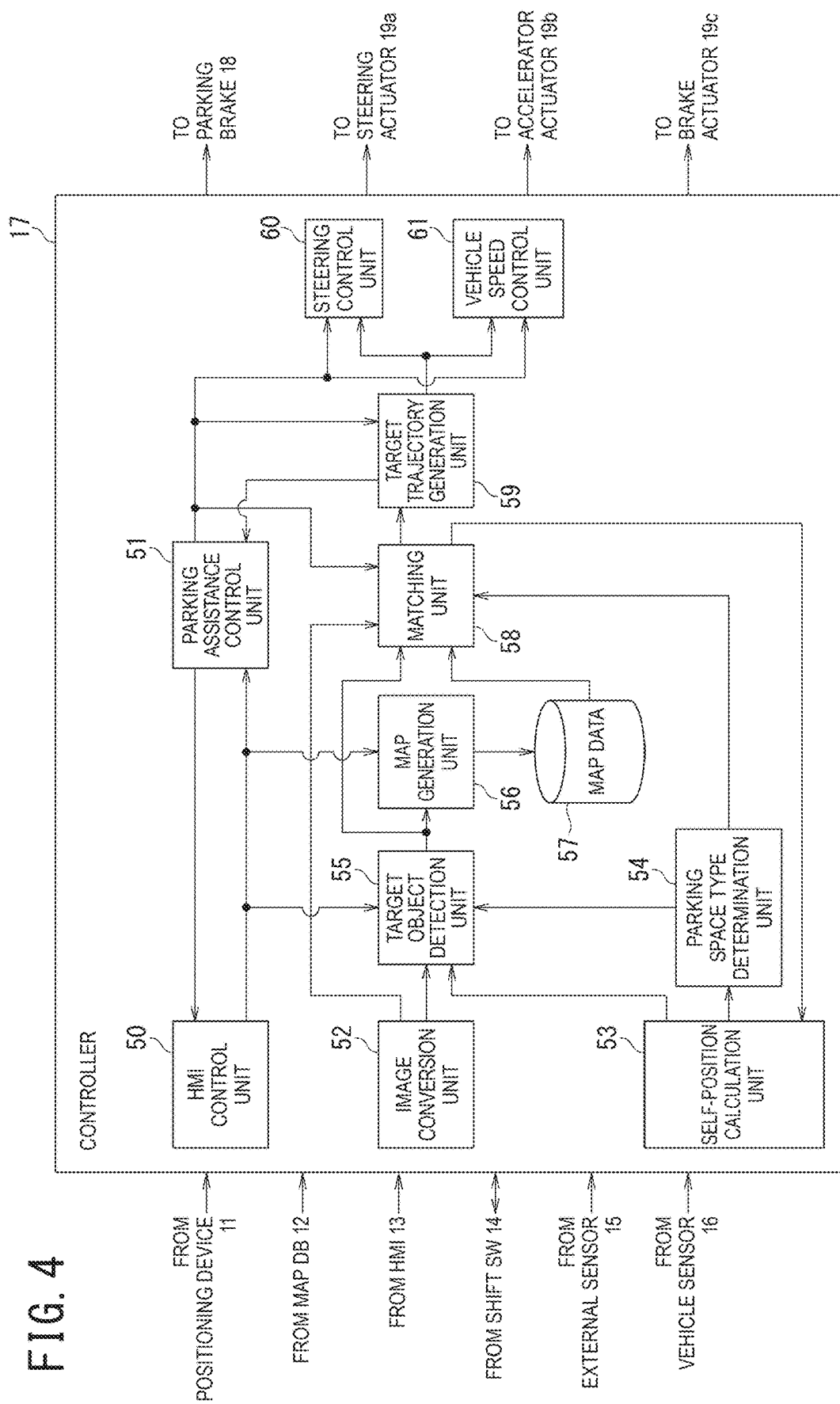
FIG. 4 is a block diagram of an example of a functional configuration of a controller in FIG. 1.

Next, a functional configuration of the controller 17 will be described in more detail. FIG. 4 is now referred to. An HMI control unit 50 outputs a map generation command to cause learned target object data to be stored in the storage device 21 to a map generation unit 56 when the parking position learning switch is operated by the passenger. The HMI control unit 50 determines whether or not the passenger has performed a shift operation for turnabout, and outputs a determination result to a parking assistance control unit 51. In addition, when the HMI control unit 50 detects that the parking assistance activation switch in the HMIs 13 has been operated by the passenger, the HMI control unit 50 outputs the detection result to the parking assistance control unit 51.

The parking assistance control unit 51 determines whether or not the parking assistance control is to be started. For example, the parking assistance control unit 51 starts the parking assistance control when the own vehicle 1 is determined to be positioned in a parking space of the first type by a parking space type determination unit 54, which will be described later, and the above-described parking assistance start condition is established.

Alternatively, the parking assistance control unit 51 determines whether or not the own vehicle 1 is positioned in a vicinity of a parking space of the second type stored as the target parking position. For example, the parking assistance control unit 51 determines whether or not distance between the own vehicle 1 and the parking space of the second type is less than or equal to a predetermined distance. For example, the parking assistance control unit 51 may determine whether or not the distance between the own vehicle 1 and the parking space of the second type is less than or equal to the predetermined distance, using the positioning device 11. Alternatively, the parking assistance control unit 51 may store a feature amount of a target object in the vicinity of the parking space of the second type in advance and determine whether or not the external sensors 15 detect a target object having a similar feature amount. The parking assistance control unit 51 starts the parking assistance control when the own vehicle 1 is determined to be positioned in the vicinity of the parking space of the second type that is stored as the target parking position and the above-described parking assistance start condition is established.

When the parking assistance control unit 51 starts the parking assistance control, the parking assistance control unit 51 outputs a parking position calculation command to cause the position of the target parking position in the vehicle coordinate system to be calculated to a matching unit 58. The parking assistance control unit 51 outputs a travel trajectory calculation command to cause a target travel trajectory starting from the current position of the own vehicle 1 and reaching the target parking position and a target vehicle speed profile in accordance with which the own vehicle 1 travels the target travel trajectory to be calculated to a target trajectory generation unit 59.

The target trajectory generation unit 59 calculates a target travel trajectory starting from the current position of the own vehicle 1 and reaching the target parking position and a target vehicle speed profile and outputs the calculated target travel trajectory and target vehicle speed profile to the parking assistance control unit 51. To the calculation of the target travel trajectory and the target vehicle speed profile, a well-known method that is employed for an automated parking device can be applied.

The parking assistance control unit 51 outputs the target travel trajectory and information about the current position of the own vehicle 1 to the HMI control unit 50. When the target travel trajectory includes turnabout, the parking assistance control unit 51 outputs information about a turnabout position to the HMI control unit 50. The HMI control unit 50 displays the target travel trajectory, the current position of the own vehicle 1, and the turnabout position on an HMI 13.

In addition, the parking assistance control unit 51 outputs a steering control command to control steering in such a way as to cause the own vehicle 1 to travel along the calculated target travel trajectory to a steering control unit 60. In addition, the parking assistance control unit 51 outputs a vehicle speed control command to control vehicle speed of the own vehicle 1 in accordance with the calculated target vehicle speed profile to a vehicle speed control unit 61.

An image conversion unit 52 converts a captured image captured by the camera to an overhead image (an around view monitoring image) that is an image viewed from a virtual viewpoint directly above the own vehicle 1. The image conversion unit 52 generates a surrounding image that is an image depicting the surrounding region of the own vehicle 1 by converting a captured image to an overhead image at a predetermined interval (for example, every time the own vehicle 1 travels a predetermined distance (for example, 50 cm) or travels for a predetermined time (for example, for one second)) and accumulating converted overhead images along a travel route of the own vehicle 1.

A self-position calculation unit 53 calculates the current position of the own vehicle 1 in the map coordinate system by dead reckoning based on vehicle information output from the vehicle sensors 16.

The parking space type determination unit 54 determines whether or not the own vehicle 1 is positioned in a parking space of the first type.

For example, as illustrated in FIG. 2A, in the parking space of the first type, similar patterns successively exist to represent the plurality of parking sections 30a to 30d. Therefore, the parking space type determination unit 54 may determine that the own vehicle 1 is positioned in a parking space of the first type when similar patterns successively exist in a surrounding image generated by the image conversion unit 52. In addition, for example, the parking space type determination unit 54 may determine whether or not the own vehicle 1 is positioned in a parking space of the first type, based on the current position of the own vehicle 1 measured by the positioning device 11 and information about the parking space stored in the map DB 12.

When learned target object data are to be stored in the storage device 21, the passenger parks the own vehicle 1 at the target parking position by manual driving and operates the parking position learning switch.

When the own vehicle 1 is determined to be positioned in a parking space of the first type, a target object detection unit 55 detects a target object indicating a parking section in which the own vehicle 1 is to be parked from a surrounding image output from the image conversion unit 52 and generates information representing a feature of the detected target object as target object feature data.

For example, the target object detection unit 55 may generate a partial image (a pavement pattern) depicting a local region including all or a portion of a pavement marking indicating the parking section in which the own vehicle 1 is parked as target object feature data of the target object representing the parking section.

Figure 5:
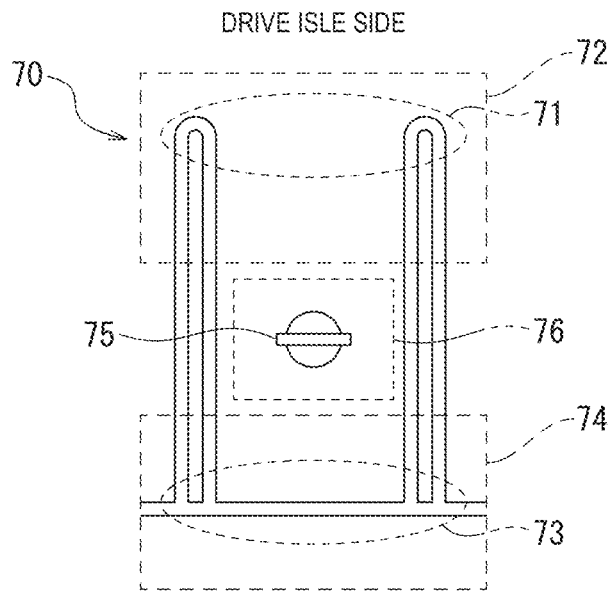
FIG. 5 is a schematic diagram of an example of a local region including a pattern indicating a parking section.

FIG. 5 is a schematic diagram of an example of a local region including a pattern of a pavement marking indicating a parking section. For example, the target object detection unit 55 may detect a pavement marking 71 including, of both ends in the longitudinal direction of a pavement marking indicating a parking section 70, ends on a side on which a drive aisle adjacent to the parking section 70 is located, as a target object and generate a partial image depicting a local region 72 including the pavement marking 71, as target object feature data of the target object indicating the parking section.

In addition, for example, the target object detection unit 55 may detect a pavement marking 73 including, of both ends in the longitudinal direction of the pavement marking indicating the parking section 70, ends on an opposite side to the drive aisle adjacent to the parking section 70, as a target object and generate a partial image depicting a local region 74 including the pavement marking 73, as target object feature data of the target object indicating the parking section.

In addition, for example, the target object detection unit 55 may detect a pavement marking 75 disposed in the parking section 70, as a target object and generate a partial image depicting a local region 76 including the pavement marking 75, as target object feature data of the target object indicating the parking section.

FIG. 4 is now referred to. The target object detection unit 55 receives the current position of the own vehicle 1 when the own vehicle 1 is parked in a parking section from the self-position calculation unit 53 and acquires a parking position Pr.

The map generation unit 56 stores target object feature data of a target object detected by the target object detection unit 55 and relative position data indicating a relative positional relationship between the parking position Pr and the target object, in the storage device 21 as learned target object data and thereby generates map data 57.

On the other hand, when the own vehicle 1 is determined to be positioned in a vicinity of a parking space of the second type, the target object detection unit 55 detects a target object in the surroundings of the parking space as the parking space of the second type from a surrounding image output from the image conversion unit 52. For example, the target object detection unit 55 detects a feature point of a target object and an image feature amount of the feature point. For detection of a feature point and calculation of an image feature amount, various methods, such as SIFT, SURF, ORB, BRIAK, KAZE, and AKAZE, can be made use of.

Further, the target object detection unit 55 receives the current position of the own vehicle 1 from the self-position calculation unit 53. The map generation unit 56 calculates a position of a target object in the map coordinate system, based on a current position of the own vehicle 1 when the target object is detected and calculates a parking position in the map coordinate system, based on a current position of the own vehicle 1 when the own vehicle 1 is parked in the parking space.

The map generation unit 56 stores a feature point and an image feature amount of the target object detected by the target object detection unit 55 in the storage device 21 as target object feature data and generates the map data 57 by storing the position of the target object and the parking position in the map coordinate system in the storage device 21 as relative position data between the target object and the parking space.

When subsequently, the parking assistance control unit 51 starts the parking assistance control, the matching unit 58 receives the parking position calculation command from the parking assistance control unit 51.

When the own vehicle 1 is determined to be positioned in a parking space of the first type, the matching unit 58 retrieves the target object feature data representing the target object indicating the parking section and the relative position data between the target object and the target parking position, which are stored in the storage device 21 as the learned target object data. The matching unit 58 detects a target object indicating the parking section from a surrounding image generated by the image conversion unit 52 by applying template matching to the surrounding image, using the target object feature data as a template. The matching unit 58 calculates a current relative position of the own vehicle 1 with respect to the parking section that is the target parking position, based on a detected position of the target object in the surrounding image and the relative position data retrieved from the storage device 21.

On the other hand, when the own vehicle 1 is determined to be positioned in a vicinity of a parking space of the second type, the target object detection unit 55 detects a surrounding target object in the surroundings of the own vehicle 1 from a surrounding image output from the image conversion unit 52. The matching unit 58 matches the target object stored as the learned target object data with the surrounding target object detected by the target object detection unit 55 when the parking assistance is performed, and associates the same target objects with each other.

The matching unit 58 calculates a current relative position of the own vehicle with respect to the target parking position, based on a relative positional relationship between the target object represented by the learned target object data associated with the surrounding target object and the target parking position and a relative positional relationship between the surrounding target object and the own vehicle 1.

For example, positions of surrounding target objects are denoted by $(x_i, y_i)$, and positions of target objects of learned target object data each of which is associated with one of the surrounding target objects are denoted by $(x_{mi}, y_{mi})$ ($i=1$ to $N$). The matching unit 58 calculates an affine transformation matrix $M_{affine}$, using the following equation, based on a least-square method.

$$\begin{bmatrix} a_1 \\ a_2 \\ a_3 \\ a_4 \end{bmatrix} = [X_X^T X_X]^{-1} X_X^T X_{tfm} \quad \text{[Math 1]}$$

where $$X_x = \begin{bmatrix} x_{m1} & y_{m1} & 1 & 0 \\ y_{m1} & -x_{m1} & 0 & 1 \\ \vdots & \vdots & \vdots & \vdots \\ x_{mN} & y_{mN} & 1 & 0 \\ y_{mN} & -x_{mN} & 0 & 1 \end{bmatrix}$$

$$X_{tfm} = \begin{bmatrix} x_1 \\ y_1 \\ \vdots \\ x_N \\ y_N \end{bmatrix}$$

$$M_{affine} = \begin{bmatrix} a_1 & a_2 & a_3 \\ -a_2 & a_1 & a_4 \end{bmatrix}$$

The matching unit 58 converts a position (targetx$_m$, targety$_m$) of the target parking position in the map coordinate system, which is stored in the map data 57, to a position (targetx, targety) in the vehicle coordinate system, using the following equation.

$$\begin{Bmatrix} targetx \\ targety \end{Bmatrix} = M_{affine} \begin{Bmatrix} targetx_m \\ targety_m \\ 1 \end{Bmatrix} \quad \text{[Math 2]}$$

When the target trajectory generation unit 59 receives the travel trajectory calculation command from the parking assistance control unit 51, the target trajectory generation unit 59 calculates a target travel trajectory starting from the current position of the own vehicle 1 and reaching the target parking position in the vehicle coordinate system and a target vehicle speed profile in accordance with which the own vehicle 1 travels the target travel trajectory. When the steering control unit 60 receives the steering control command from the parking assistance control unit 51, the steering control unit 60 controls the steering actuator 19a in such a way that the own vehicle 1 travels along the target travel trajectory. When the vehicle speed control unit 61 receives the vehicle speed control command from the parking assistance control unit 51, the vehicle speed control unit 61 controls the accelerator actuator 19b and the brake actuator 19c in such a way that vehicle speed of the own vehicle 1 changes in accordance with the target vehicle speed profile. Because of this configuration, the own vehicle 1 is controlled to travel along the target travel trajectory.

When the own vehicle 1 reaches the target parking position and the parking assistance control is completed, the parking assistance control unit 51 causes a parking brake 18 to operate and switches the shift position to a parking range (P range).

(Operation)

Figure 6:
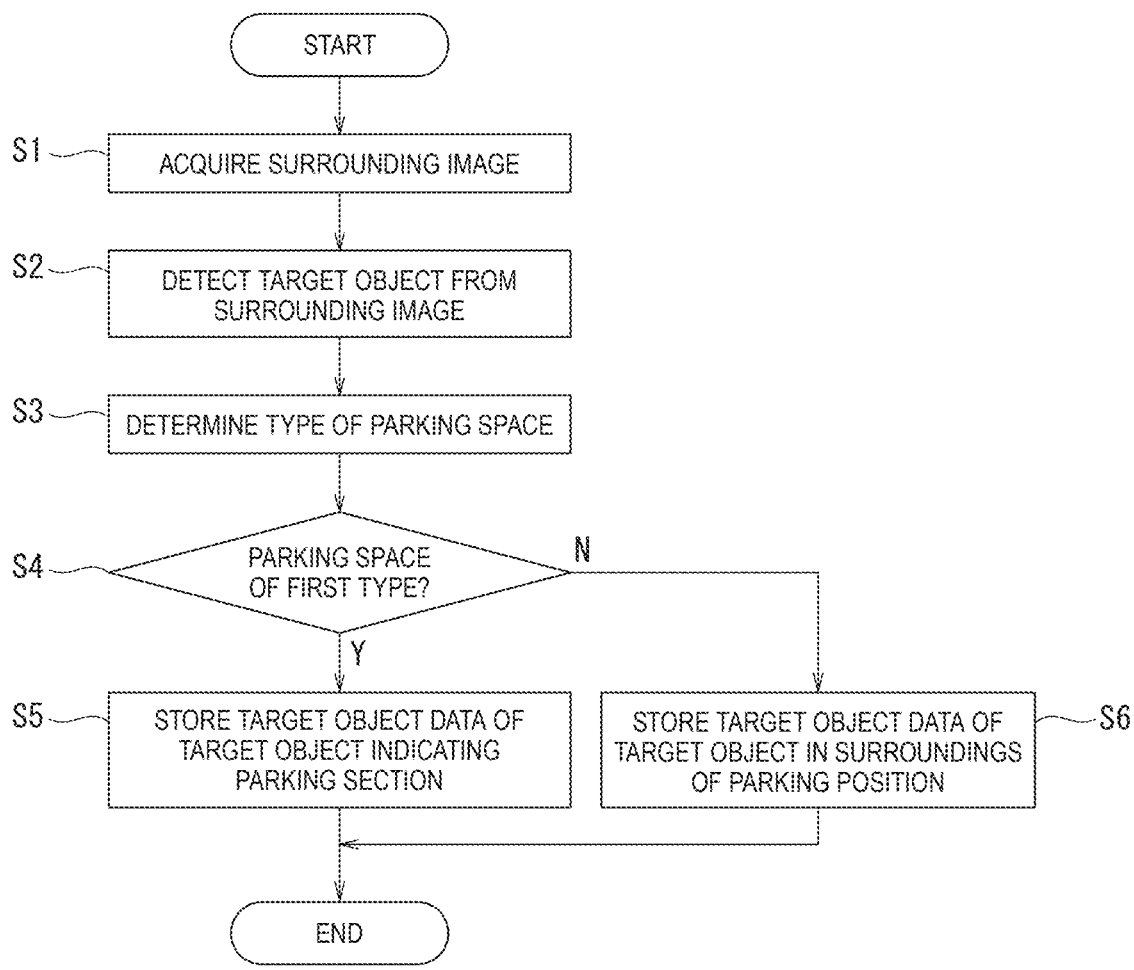
FIG. 6 is a flowchart of an example of processing of storing learned target object data.

FIG. 6 is a flowchart of an example of processing of storing learned target object data.

In step S1, the image conversion unit 52 converts a captured image captured by the camera to an overhead image that is an image viewed from a virtual viewpoint directly above the own vehicle 1 and acquires a surrounding image. In step S2, the target object detection unit 55 detects a target object from the acquired surrounding image. When the own vehicle 1 is parked in a parking space of the first type, all or a portion of a pavement marking indicating a parking section in which the own vehicle 1 is parked is detected as a target object. When the own vehicle 1 is parked in a parking space of the second type, a target object in the surroundings of a parking space is detected.

In step S3, the parking space type determination unit 54 determines whether or not the own vehicle 1 is positioned in a parking space of the first type. When the own vehicle 1 is positioned in a parking space of the first type (step S4: Y), the process proceeds to step S5. When the own vehicle 1 is positioned in a vicinity of a parking space of the second type in which a single vehicle can be parked (step S4: N), the process proceeds to step S6. In step S5, the map generation unit 56 stores target object feature data representing a feature of the target object indicating a parking section in the parking space of the first type and relative position data between the target object and a parking position, in the storage device 21 as learned target object data. Subsequently, the process terminates. In step S6, the map generation unit 56 stores target object feature data representing a feature of the target object in the surroundings of the parking space as the parking space of the second type and relative position data between the target object and the parking space, in the storage device 21 as learned target object data. Subsequently, the process terminates.

Figure 7:
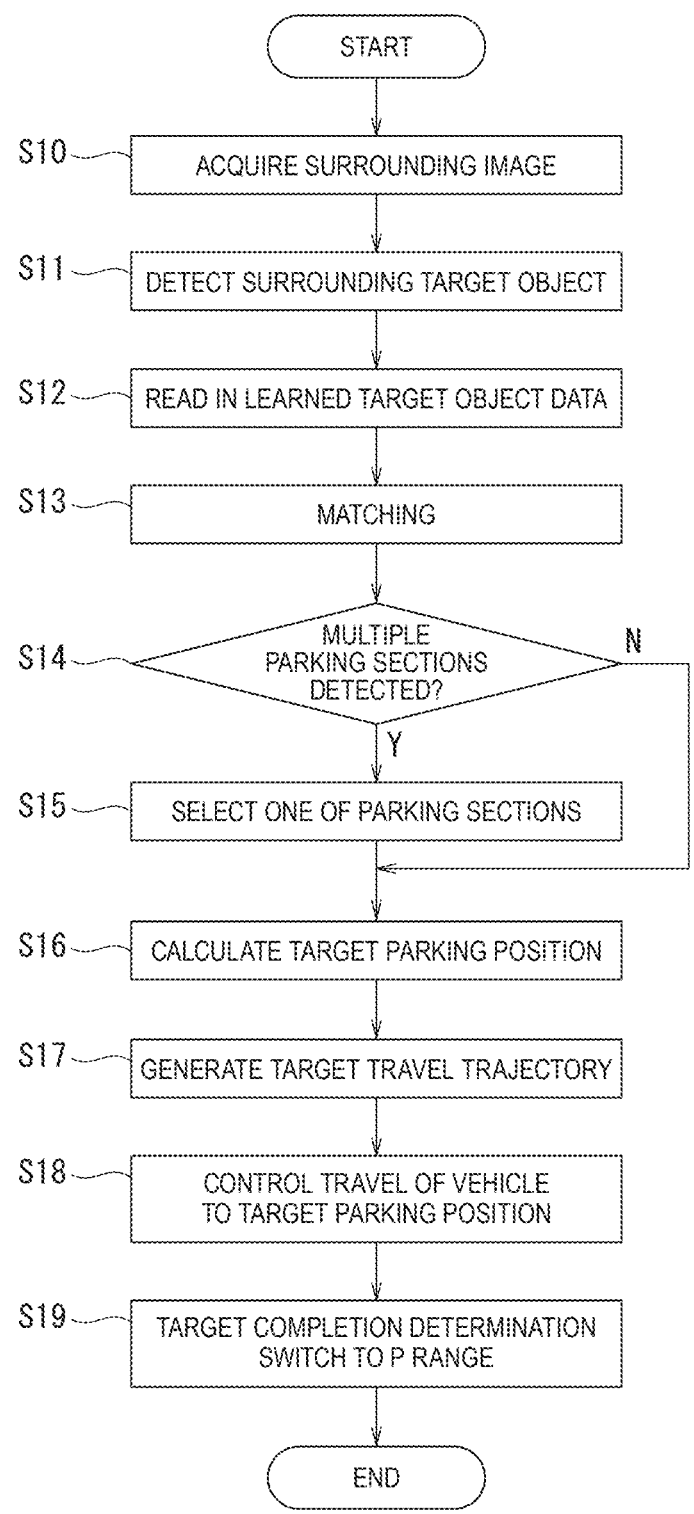
FIG. 7 is a flowchart of the first example of the processing performed when the parking assistance is performed.

FIG. 7 is a flowchart of a first example of processing when the parking assistance is performed. In step S10, the image conversion unit 52 converts a captured image captured by the camera to an overhead image and acquires a surrounding image. In step S11, the target object detection unit 55 detects a surrounding target object from the surrounding image. In step S12, the matching unit 58 retrieves learned target object data from the storage device 21. In step S13, the matching unit 58 matches a target object represented by the learned target object data with the surrounding target object. In step S14, the matching unit 58 determines whether or not a plurality of parking sections are detected. When a plurality of parking sections are detected (step S14: Y), the process proceeds to step S15. When a plurality of parking sections are not detected (step S14: N), the process proceeds to step S16. In step S15, the matching unit 58 selects one parking section from the plurality of parking sections as a parking section in which the own vehicle 1 is to be parked by accepting a selection input by the passenger to select one of the plurality of parking sections. Subsequently, the process proceeds to step S16.

In step S16, the matching unit 58 calculates a current relative position of the own vehicle 1 with respect to the parking section that is a target parking position. In step S17, the target trajectory generation unit 59 calculates a target travel trajectory and a target vehicle speed profile. In step S18, the steering control unit 60 and the vehicle speed control unit 61 control the steering actuator 19a, the accelerator actuator 19b, and the brake actuator 19c, based on the target travel trajectory and the target vehicle speed profile. In step S19, when the parking assistance control is completed, the parking assistance control unit 51 causes the parking brake 18 to operate and switches the shift position to the P range.

FIG. 8 is a flowchart of a second example of the processing when the parking assistance is performed. In step S20, the parking space type determination unit 54 determines whether or not the own vehicle 1 is positioned in a parking space of the first type. In step S21, the image conversion unit 52 converts a captured image captured by the camera to an overhead image that is an image viewed from a virtual viewpoint directly above the own vehicle 1 and acquires a surrounding image. When the own vehicle 1 is positioned in a parking space of the first type (step S22: Y), the process proceeds to step S23. When the own vehicle 1 is positioned in a vicinity of a parking space of the second type in which a single vehicle can be parked (step S22: N), the process proceeds to step S25. In step S23, the matching unit 58 retrieves target object feature data representing a target object indicating a parking section in the parking space of the first type and relative position data between the target object and a target parking position, which are stored as learned target object data. In step S24, the matching unit 58 detects a target object indicating a parking section from the surrounding image acquired in step S21 by applying template matching to the surrounding image, using the target object feature data as a template and calculates a current relative position of the own vehicle 1 with respect to the parking section that is the target parking position. Subsequently, the process proceeds to step S29.

In step S25, the target object detection unit 55 detects a surrounding target object in the surroundings of the own vehicle 1. In step S26, the matching unit 58 retrieves target object feature data representing a target object in the surroundings of the parking space as the parking space of the second type and relative position data between the target object and the target parking position, which are stored as learned target object data. In step S27, the matching unit 58 matches the target object represented by the learned target object data with the surrounding target object. In step S28, the matching unit 58 calculates the target parking position, based on a matching target object. Subsequently, the process proceeds to step S29. Processing in steps S29 to S31 is the same as the processing in steps S18 to S19 in FIG. 7.

Advantageous Effects of Embodiment (1) In the parking assisting method of the embodiment, whether the own vehicle 1 is positioned in a parking space of a first type including a plurality of parking sections or the own vehicle 1 is positioned in a vicinity of a parking space of a second type in which a single vehicle can be parked is determined, and in a case where the own vehicle 1 is determined to be positioned in the parking space of the first type, when the own vehicle 1 is parked in a target parking section that is one parking section of the plurality of parking sections, data representing a relative positional relationship between a target object common to the plurality of parking sections, which indicates a parking section and a parking position in the target parking section are stored in a storage device as learned target object data and in a case where the own vehicle 1 is determined to be positioned in a vicinity of the parking space of the second type, data representing a relative positional relationship between a target object detected in the vicinity of the parking space of the second type when the own vehicle 1 is parked in the parking space of the second type and a target parking position are stored in the storage device as learned target object data.

Because of this configuration, in a parking space of the first type that includes a plurality of parking sections, by detecting a local pattern indicating a parking section from the surroundings of the own vehicle 1, each of a plurality of parking sections that are indicated by similar patterns can be detected as a target parking position. As a result, it becomes possible to arbitrarily select a parking section in which the own vehicle 1 is to be parked. Meanwhile, in a parking space of the second type in which a single vehicle can be parked, by storing an overall arrangement pattern of target objects detected in the vicinity of the parking space, it becomes possible to stably detect a target parking position regardless of environmental change and variation in a vehicle position.

(2) In the case where the own vehicle 1 is determined to be positioned in the parking space of the first type, a parking section in which the own vehicle is to be parked may be selected by accepting a selection input by a passenger to select one of the plurality of parking sections. Because of this configuration, the passenger can arbitrarily select a parking section in which the own vehicle 1 is to be parked from a plurality of parking sections.

(3) Whether or not similar patterns successively appear in a surrounding image that is an image obtained by capturing the surroundings of the own vehicle 1 may be determined, and when similar patterns successively appear in the surrounding image, it may be determined that the own vehicle 1 is positioned in the parking space of the first type.

Because of this configuration, whether or not the own vehicle 1 is positioned in a parking space of the first type can be easily determined based on the surrounding image.

(4) Whether or not the own vehicle 1 is positioned in a parking space of the first type may be determined based on a positioning result of a positioning device included in the own vehicle 1 and map information. Because of this configuration, whether or not the own vehicle 1 is positioned in a parking space of the first type can be easily determined by a vehicle that includes, for example, a navigation device.

(5) Data representing a relative positional relationship between a pavement marking including, of both ends in a longitudinal direction of the target parking section, an end on a side on which a drive aisle adjacent to the target parking section is located and a parking position in the target parking section may be stored in the storage device as the learned target object data. Because of this configuration, the learned target object data of a target object indicating a parking section can be stored.

(6) Data representing a relative positional relationship between a pavement marking including, of both ends in the longitudinal direction of the target parking section, an end on an opposite side to the drive aisle adjacent to the target parking section and a parking position in the target parking section may be stored in the storage device as the learned target object data. Because of this configuration, the learned target object data of a target object indicating a parking section can be stored.

(7) Data representing a relative positional relationship between a pavement marking disposed in the target parking section and a parking position in the target parking section may be stored in the storage device as the learned target object data. Because of this configuration, the learned target object data of a target object indicating a parking section can be stored.

REFERENCE SIGNS LIST

1 Own vehicle
10 Parking assistance device
17 Controller

The invention claimed is:
1. A parking assisting method for assisting parking of an own vehicle at a target parking position, the parking assisting method comprising:
    storing data representing a relative positional relationship between a target object existing in surroundings of a target parking position and the target parking position, in a storage device as learned target object data, in advance;

detecting a position of a surrounding target object, the surrounding target object being a target object existing in surroundings of the own vehicle;

calculating a relative positional relationship between the target parking position and a current position of the own vehicle, based on the learned target object data and a position of the surrounding target object;

calculating a travel trajectory starting from a current position of the own vehicle and reaching the target parking position, based on a relative positional relationship between the target parking position and a current position of the own vehicle; and assisting parking of the own vehicle at the target parking position, based on the travel trajectory, wherein the parking assisting method further determines whether the own vehicle is positioned in a parking space of a first type including a plurality of parking sections or the own vehicle is positioned in a vicinity of a parking space of a second type in which a single vehicle can be parked, and in a case of determining that the own vehicle is positioned in the parking space of the first type, when the own vehicle is parked in a target parking section, the target parking section being one parking section of the plurality of parking sections, determines whether or not a target object in surroundings of the target parking section has a feature common to the plurality of parking sections, which indicates a parking section, when the target object in surroundings of the target parking section has the feature common to the plurality of parking sections, which indicates a parking section, stores the target object in surroundings of the target parking section, and stores data representing a relative positional relationship between the target object and a parking position in the target parking section, in the storage device as the learned target object data, and in a case of determining that the own vehicle is positioned in a vicinity of the parking space of the second type, stores data representing a relative positional relationship between a target object detected in a vicinity of the parking space of the second type when the own vehicle is parked in the parking space of the second type and the target parking position, in the storage device as the learned target object data.

2. The parking assisting method according to claim 1, wherein in a case of determining that the own vehicle is positioned in the parking space of the first type, the parking assisting method selects a parking section in which the own vehicle is to be parked by accepting a selection input by a passenger to select one of the plurality of parking sections.

3. The parking assisting method according to claim 1 comprising:

determining whether or not similar patterns successively appear in a surrounding image, the surrounding image being an image obtained by capturing surroundings of the own vehicle, and determining that the own vehicle is positioned in the parking space of the first type when similar patterns successively appear in the surrounding image.

4. The parking assisting method according to claim 1, wherein the parking assisting method determines whether or not the own vehicle is positioned in the parking space of the first type, based on a positioning result of a positioning device included in the own vehicle and map information.

5. The parking assisting method according to claim 1, wherein the parking assisting method stores data representing a relative positional relationship between a pavement marking including, of both ends in a longitudinal direction of the target parking section, an end on a side on which a drive aisle adjacent to the target parking section is located and a parking position in the target parking section, in the storage device as the learned target object data.

6. The parking assisting method according to claim 1, wherein the parking assisting method stores data representing a relative positional relationship between a pavement marking including, of both ends in a longitudinal direction of the target parking section, an end on an opposite side to a drive aisle adjacent to the target parking section and a parking position in the target parking section, in the storage device as the learned target object data.

7. The parking assisting method according to claim 1, wherein the parking assisting method stores data representing a relative positional relationship between a pavement marking disposed in the target parking section and a parking position in the target parking section, in the storage device as the learned target object data.

8. A parking assistance device comprising:

a sensor configured to detect a target object in surroundings of an own vehicle;

a storage device; and a controller configured to: store data representing a relative positional relationship between a target object existing in surroundings of a target parking position and the target parking position, in a storage device as learned target object data, in advance; detect a position of a surrounding target object using the sensor, the surrounding target object being a target object existing in surroundings of the own vehicle; calculate a relative positional relationship between the target parking position and a current position of the own vehicle, based on the learned target object data and a position of the surrounding target object; calculate a travel trajectory starting from a current position of the own vehicle and reaching the target parking position, based on a relative positional relationship between the target parking position and a current position of the own vehicle; and assist parking of the own vehicle at the target parking position, based on the travel trajectory, wherein the controller determines whether the own vehicle is positioned in a parking space of a first type including a plurality of parking sections or the own vehicle is positioned in a vicinity of a parking space of a second type in which a single vehicle can be parked, and in a case of determining that the own vehicle is positioned in the parking space of the first type, when the own vehicle is parked in a target parking section, the target parking section being one parking section of the plurality of parking sections, determines whether or not a target object in surroundings of the target parking section has a feature common to the plurality of parking sections, which indicates a parking section, when the target object in surroundings of the target parking section has the feature common to the plurality of parking sections, which indicates a parking section, stores the target object in surroundings of the target parking section, and stores data representing a relative positional relationship between the target object and a parking position in the target parking section, in the storage device as the learned target object data, and in a case of determining that the own vehicle is positioned in a vicinity of the parking space of the second type, stores data representing a relative positional relationship between a target object detected in a vicinity of the parking space of the second type when the own vehicle is parked in the parking space of the second type and the target parking position, in the storage device as the learned target object data.

* * * * *